Sept. 8, 1942. H. M. ULLSTRAND 2,295,064
REFRIGERATION
Filed March 17, 1938
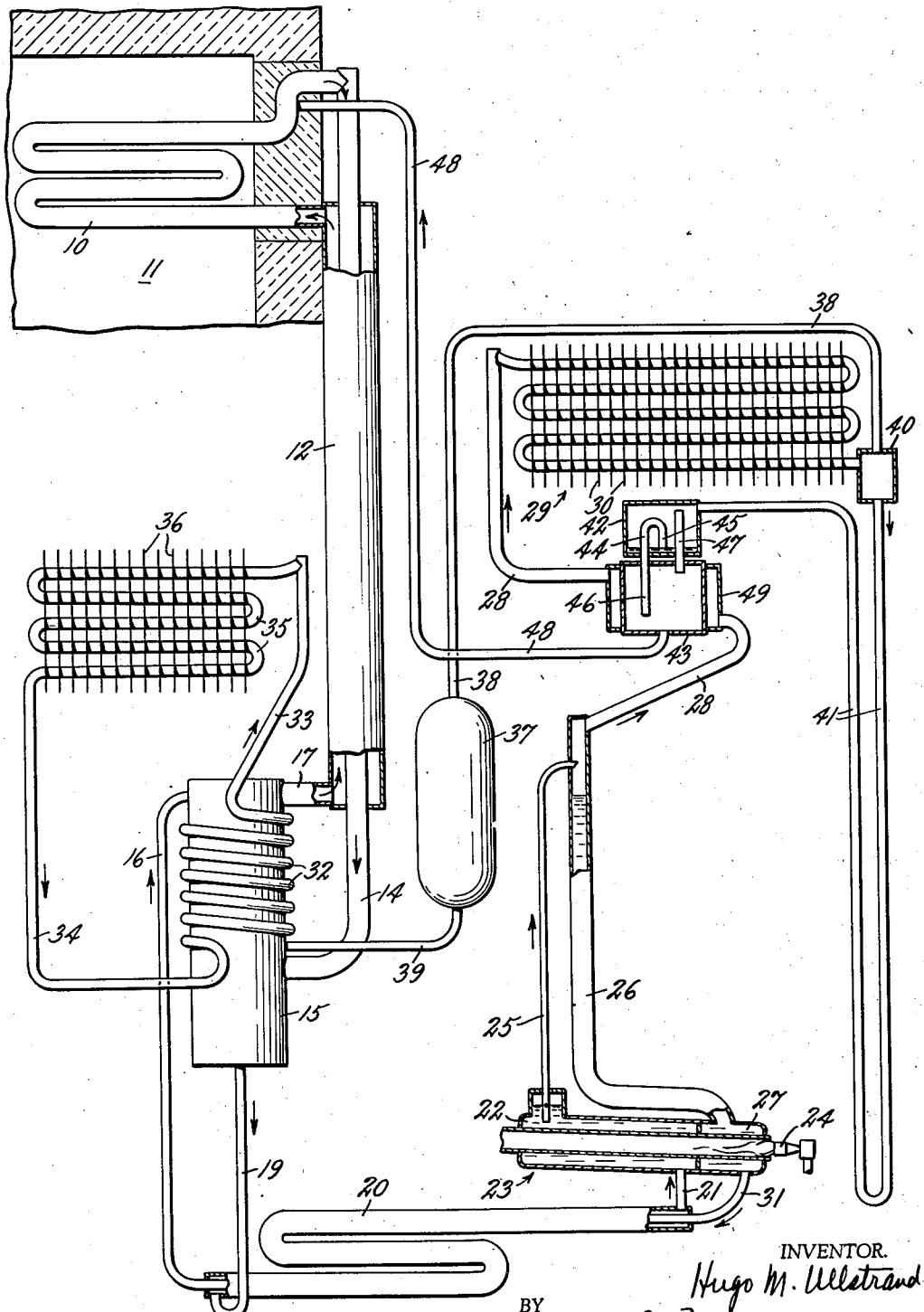
INVENTOR.
Hugo M. Ullstrand
BY E. A. Fenander
his ATTORNEY.

Patented Sept. 8, 1942

2,295,064

UNITED STATES PATENT OFFICE 2,295,064

REFRIGERATION

Hugo M. Ullstrand, Evansville, Ind., assignor to Servel, Inc., New York, N. Y., a corporation of Delaware Application March 17, 1938, Serial No. 196,318

12 Claims. (Cl. 62—119.5)

My invention relates to refrigeration, and more particularly to an absorption refrigeration system employing an auxiliary pressure equalizing gas.

It is an object of the invention to provide an improvement in systems of this type for raising liquid refrigerant from a condenser at one level to an evaporator or cooling element at a higher level.

The above and other objects and advantages of the invention will become apparent from the following description taken in conjunction with the accompanying drawing forming a part of this specification, and of which the single figure more or less diagrammatically illustrates a refrigeration system embodying the invention.

In the drawing I have shown my invention embodied in an absorption refrigeration system of a uniform pressure type, generally like that described in Patent No. 2,037,782 to William R. Hainsworth, in which an auxiliary pressure equalizing gas is employed. The system includes a cooling element or evaporator 10 which is disposed in a thermally insulated space 11. Refrigerant fluid, such as ammonia, evaporates in cooling element 10 and diffuses into an inert gas, such as hydrogen, to produce a refrigerating effect.

The resulting rich mixture of refrigerant and inert gas flows from cooling element 10 through the inner passage of a gas heat exchanger 12 and a conduit 14 into the lower part of an absorber 15. In absorber 15 refrigerant vapor is absorbed by a suitable liquid absorbent, such as water, which enters through a conduit 16.

The inert gas, which is practically insoluble and weak in refrigerant, is returned to the lower end of cooling element 10 through conduit 17 and the outer passage of gas heat exchanger 12. Enriched absorption liquid is conducted from absorber 15 through conduit 19, the outer passage of a liquid heat exchanger 20, and conduit 21 to the rear chamber 22 of a generator 23.

By heating generator 23, as by a gas burner 24, for example, refrigerant vapor and absorption liquid are raised by vapor-lift action through a conduit 25 into the upper part of a stand-pipe 26 which is connected at its lower end to a forward chamber 27 of the generator. Refrigerant vapor entering stand-pipe 26 through conduit 25, together with refrigerant vapor expelled from solution in stand-pipe 26 and chamber 27, flows upward through conduit 28 into an air-cooled condenser 29 which is in the form of a looped coil provided with a plurality of cooling fins 30. Refrigerant vapor is condensed in condenser 29 and returned to cooling element 10 to complete the refrigerating cycle, as will be described hereinafter.

The weakened absorption liquid from which refrigerant has been expelled is conducted from chamber 27 through conduit 31, the inner passage of liquid heat exchanger 20, and conduit 16 into the upper part of absorber 15. A coil 32 arranged in thermal exchange relation with absorber 15 is connected by conduits 33 and 34 to a looped coil 35 provided with cooling fins 36. The coils 32 and 36 and conduits connecting these parts form a secondary heat transfer system which is partly filled with a volatile liquid. Evaporation of liquid in coil 32 takes up heat liberated with absorption of refrigerant vapor in absorber 15, and condensation of the vapors in coil 35 gives up heat to air flowing over the surfaces of looped coil 35 and cooling fins 36.

A pressure vessel 37 is connected by conduits 38 and 39 to the lower part of condenser 29 and to the gas circuit, as at absorber 15, for example, whereby any inert gas which may pass through the condenser can flow into the gas circuit. Refrigerant vapor not liquefied in the condenser will flow through conduit 38 to displace inert gas in vessel 37 and force such gas through conduit 39 into the gas circuit, thereby raising the total pressure in the system so that an adequate condensing pressure is obtained to insure condensation of refrigerant vapor in condenser 29.

In accordance with my invention, an improvement is provided for raising liquid refrigerant from condenser 29 at a low elevation to cooling element 10 at a higher elevation. This is accomplished by providing a gas separating chamber 40 at the lower end of condenser 29 and connecting the lower end of chamber 40 by a U-shaped conduit 41 to the upper part of a vessel 42. Below vessel 42 is disposed a second vessel 43.

Within vessel 42 is located an inverted U-shaped siphon tube 44 having one arm 45 terminating in the lower part of vessel 42. The other arm 46 of siphon tube 44 extends downwardly into vessel 43 and terminates in the lower part thereof. A vent conduit 47 provides communication between the upper parts of vessels 42 and 43.

The lower part of vessel 43 is connected by a vertically extending conduit 48 to the upper part of cooling element 10. The vessel 43 is provided with a jacket 49 which is connected in conduit 28, whereby refrigerant vapor flowing from generator 23 to condenser 29 will flow in thermal exchange relation with liquid in vessel 43.

During operation of the refrigeration system, refrigerant vapor condensed in condenser 29 flows into U-shaped conduit 41 which forms a liquid trap. With U-shaped conduit 41 filled with refrigerant, refrigerant will flow into upper vessel 42. When the liquid level in vessel 42 rises to the upper end of siphon tube 44, liquid refrigerant is siphoned through tube 44 and accumulates in lower vessel 43 and the lower end of conduit 48. The flow of liquid refrigerant into vessel 43 stops when the liquid level falls below the lower end of arm 45 in vessel 42.

Liquid refrigerant in lower vessel 43 is heated and vaporized by refrigerant vapor flowing through jacket 49 from generator 23 to condenser 29. The vapor formed in vessel 43 may flow into vessel 42 through vent conduit 47. The vapor pressure above liquid refrigerant in vessel 43 and also in vessel 42 continues to increase due to vaporization of liquid, and, when this vapor pressure is sufficiently great, liquid refrigerant in vessel 43 is raised through conduit 48 and into cooling element 10.

When all of the liquid in lower vessel 43 has been raised through conduit 48 into cooling element 10, the trapped vapor is released into cooling element 10. With cooling element 10 in open communication with vessels 43 and 42, the pressure in the system becomes equalized and liquid will again flow into upper vessel 42 through U-shaped conduit 41. When the liquid level in vessel 42 again rises to the upper end of siphon tube 44, liquid flows from vessel 42 into lower vessel 43 and the vapor pressure again builds up in vessels 42 and 43 due to vaporization of liquid in lower vessel 43.

When vapor is trapped in vessels 42 and 43 and liquid refrigerant is being raised in conduit 48 into cooling element 10, the trapped vapor will also force liquid downward in the left-hand leg of U-shaped conduit 41. The height of the liquid trap formed by U-shaped conduit 41 should be greater than the height through which liquid refrigerant is raised in conduit 48, so that trapped vapor will be released to cooling element 10 before vapor can pass into the right-hand leg of U-shaped conduit 41.

While a single embodiment of the invention has been shown and described, such variations and modifications are contemplated which fall within the true spirit and scope of the invention, as pointed out in the following claims.

What is claimed is:

1. In a refrigeration system of a type employing a pressure equalizing auxiliary medium and having an evaporator, and a condenser below said evaporator, a vessel connected to receive liquid from said condenser, a conduit to conduct liquid upward from the lower part of said vessel to said evaporator, means including a heater to heat liquid in said vessel to form vapor in the upper part thereof, such vapor being capable of exerting pressure in said vessel to force liquid therein downward and thence upward in said conduit, and means including a liquid accumulation chamber and a siphon to transfer liquid from said chamber to said vessel only when a given quantity of liquid has accumulated in said chamber, whereby operation of said first-mentioned means is prevented until said vessel contains a quantity of liquid considerably greater than that which will obstruct vapor passage in said conduit.

2. In a refrigeration system of a type employing an auxiliary pressure equalizing medium and having an evaporator and a condenser extending below the evaporator, structure to raise to said evaporator liquid formed in said condenser and including a liquid and vapor accumulator, said accumulator being in unrestricted communication with said condenser by a conduit including a liquid trap, said accumulator being in unrestricted communication with said evaporator by a riser conduit, said structure being constructed and arranged to alternately trap and release vapor to exert force intermittently above a surface level of liquid in said accumulator to cause such liquid to rise through said riser conduit, and said liquid trap being of such height that the trapped vapor is released at the upper end of said riser conduit before such trapped vapor can pass through liquid in said trap to said condenser.

3. In a refrigeration system of a uniform pressure absorption type containing an auxiliary pressure equalizing agent and having an evaporator and a condenser extending below said evaporator, structure to raise to said evaporator liquid formed in said condenser and including a device having a first chamber connected to receive liquid from said condenser and a second chamber connected to conduct liquid to said evaporator, means embodied in said device whereby a quantity of liquid is discharged to said second chamber from said first chamber when liquid in the latter reaches a predetermined level, and a heater for vaporizing liquid discharged into said second chamber to form vapor capable of exerting sufficient force above the surface level of liquid in said second chamber to raise such liquid to said evaporator.

4. In a refrigeration system of a uniform pressure absorption type containing an auxiliary pressure equalizing agent and having an evaporator and a condenser extending below said evaporator, structure to raise to said evaporator liquid formed in said condenser and including a device having a first chamber connected to receive liquid from said condenser and a second chamber connected to conduct liquid to said evaporator, means including a siphon to remove a quantity of liquid to said second chamber from said first chamber when the liquid in the latter reaches a predetermined level, and a heater for vaporizing liquid removed into said second chamber to form vapor capable of exerting sufficient force above the surface level of liquid in said second chamber to raise the liquid to said evaporator.

5. In an absorption refrigeration system having a generator in which refrigerant vapor is expelled from solution, a condenser in which the vapor is liquefied, and an evaporator above the liquid level in the condenser, structure to raise to said evaporator liquid formed in said condenser and including a liquid and vapor accumulator, said accumulator being in unrestricted communication with said condenser by a conduit including a liquid trap, said accumulator being in unrestricted communication with said evaporator by a riser conduit, said structure being constructed and arranged to alternately trap and release vapor to exert force intermittently above a surface level of liquid in said accumulator to cause such liquid to rise through said riser conduit, said liquid trap being of such height that the trapped vapor is released at the upper end of said riser conduit before such trapped vapor can pass through liquid in said trap to said condenser, and means to utilize vapor expelled from solution in said generator to heat liquid in said structure to form the trapped vapor.

6. In an absorption refrigeration system having a generator in which refrigerant vapor is expelled from solution, a condenser in which the vapor is liquefied, and an evaporator above the liquid level in the condenser, structure to raise to said evaporator liquid formed in said condenser and including a device having a first chamber connected to receive liquid from said condenser and a second chamber connected to conduct liquid to said evaporator, means embodied in said device whereby a quantity of liquid is discharged to said second chamber from said first chamber when liquid in the latter reaches a predetermined level, and means to utilize vapor expelled from solution in the generator to heat liquid discharged into said second chamber to form vapor capable of exerting sufficient force above the surface level of liquid in said second chamber to raise such liquid to said evaporator.

7. In the art of refrigeration with a system in which refrigerant fluid is expelled from an absorbent in a place of vapor expulsion, liquefied in a place of condensation, and the liquid is evaporated in a place of evaporation at a higher level than that of the place of condensation, the improvement which consists in flowing liquid from the place of condensation in a path of flow to a place of accumulation at a rate dependent solely upon the rate at which refrigerant fluid is expelled from absorbent in the place of vapor expulsion, intermittently removing a quantity of liquid from the place of accumulation to a place of liquid transfer and trapping vapor above each quantity of liquid removed to the place of liquid transfer to exert force above the liquid surface level thereof and cause downward movement of liquid in the place of liquid transfer and upward movement thereof in a path of flow extending from below the liquid surface level to the place of evaporation.

8. The improvement set forth in claim 7 in which each quantity of liquid removed from the place of accumulation to the place of liquid transfer is heated in the latter place by refrigerant vapor expelled from absorbent and flowing to the place of condensation.

9. The improvement set forth in claim 7 in which each quantity of liquid removed from the place of accumulation to the place of liquid transfer is heated by fluid in the system.

10. A refrigeration system having an evaporating part provided with connections for flow therethrough of an auxiliary pressure equalizing medium, and also provided with an inlet for liquid refrigerant, a condensing part located below said liquid inlet, a device connected to receive liquid from said condensing part, a conduit to conduct liquid from said device to said liquid inlet, said device forming a chamber and being so constructed and arranged that successive bodies of liquid are segregated responsive only to liquid level in said chamber and intermittently raised to said inlet through said conduit from a region below the surface level of each segregated body of liquid.

11. A refrigeration system having an evaporator provided with connections for flow therethrough of an auxiliary pressure equalizing medium, and also provided with an inlet for liquid, a condensing part located below said liquid inlet, a device so constructed and arranged that successive quantities of liquid are each first segregated from other liquid therein and each quantity of liquid is then raised to said evaporator liquid inlet by trapping vapor above the surface level of liquid in said device and then releasing such trapped vapor to allow another quantity of liquid to be segregated, and a conduit providing unrestricted communication between said device and said condensing part whereby liquid may flow continuously from said condenser to said device.

12. A refrigeration system having an evaporator arranged for flow therethrough of an auxiliary pressure equalizing medium and provided with a liquid inlet, a condensing part located below said evaporator liquid inlet, a device to raise to said evaporator inlet liquid formed in said condensing part, a conduit for conducting liquid from said condenser to said device and forming a liquid trap, a conduit connecting said device and said evaporator liquid inlet, said device being so constructed and arranged that liquid therein is raised in the form of a solid column of liquid extending from said device through said second conduit to said evaporator liquid inlet by alternately trapping and releasing vapor above a surface level of liquid in said device, said liquid trap being so formed as to provide a column of liquid therein equal to or greater than that in said second conduit.

HUGO M. ULLSTRAND.